United States Patent
Thubert et al.

(10) Patent No.: US 10,243,926 B2
(45) Date of Patent: Mar. 26, 2019

(54) CONFIGURING FIREWALLS FOR AN INDUSTRIAL AUTOMATION NETWORK

(71) Applicant: Cisco Technology, Inc., San Jose, CA (US)

(72) Inventors: Pascal Thubert, La Colle Sur Loup (FR); Xuechen Yang, Austin, TX (US); Rudolph B. Klecka, III, Austin, TX (US); Patrick Wetterwald, Mouans Sartoux (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 210 days.

(21) Appl. No.: 15/094,177

(22) Filed: Apr. 8, 2016

(65) Prior Publication Data
US 2017/0295141 A1    Oct. 12, 2017

(51) Int. Cl.
*H04L 29/06* (2006.01)
*H04L 29/08* (2006.01)

(52) U.S. Cl.
CPC ...... *H04L 63/0272* (2013.01); *H04L 63/0209* (2013.01); *H04L 67/12* (2013.01)

(58) Field of Classification Search
CPC .. H04L 63/0272; H04L 67/12; H04L 63/0209
See application file for complete search history.

(56) References Cited

U.S. PATENT DOCUMENTS

| | | | | |
|---|---|---|---|---|
| 7,111,163 | B1* | 9/2006 | Haney | H04L 12/4633 713/153 |
| 7,447,782 | B2* | 11/2008 | Tahan | H04L 63/104 709/225 |
| 8,516,241 | B2* | 8/2013 | Chang | H04L 63/0218 713/151 |
| 8,990,885 | B2* | 3/2015 | Chang | H04L 63/0218 718/1 |
| 9,069,599 | B2* | 6/2015 | Martinez | G06F 9/455 |
| 9,461,968 | B2* | 10/2016 | Chang | H04L 63/0218 |
| 9,489,647 | B2* | 11/2016 | Martinez | G06F 8/36 |
| 2002/0078215 | A1* | 6/2002 | Tahan | H04L 63/104 709/229 |
| 2005/0109841 | A1* | 5/2005 | Ryan | G06F 13/385 235/380 |
| 2006/0285692 | A1* | 12/2006 | Kerstens | H04L 29/06 380/270 |
| 2007/0226795 | A1* | 9/2007 | Conti | G06F 21/554 726/22 |
| 2009/0265755 | A1* | 10/2009 | Hamilton, II | H04L 63/0227 726/1 |
| 2013/0152156 | A1* | 6/2013 | Allison | H04L 63/0218 726/1 |
| 2013/0283263 | A1* | 10/2013 | Elemary | G06F 9/45558 718/1 |

(Continued)

*Primary Examiner* — Don G Zhao
(74) *Attorney, Agent, or Firm* — Behmke Innovation Group LLC; James Behmke; Stephen D. LeBarron

(57) ABSTRACT

In one embodiment, a virtual firewall is installed on a port of a device that communicates across a zone boundary within an industrial network. The virtual firewall is then configured based on operation of the industrial network, such that the port may then communicate via the firewall to a remote virtual firewall of a remote port of a remote device across the zone boundary.

16 Claims, 7 Drawing Sheets

(56) References Cited

U.S. PATENT DOCUMENTS

| | | | |
|---|---|---|---|
| 2013/0318594 A1* | 11/2013 | Hoy | H04L 63/0272 726/15 |
| 2014/0280961 A1* | 9/2014 | Martinez | H04L 41/5054 709/226 |
| 2015/0264012 A1* | 9/2015 | Rieke | H04L 63/02 726/1 |
| 2015/0365421 A1* | 12/2015 | Warrick | H04L 61/103 726/4 |
| 2016/0212051 A1* | 7/2016 | Lopez | H04L 63/0218 |

* cited by examiner

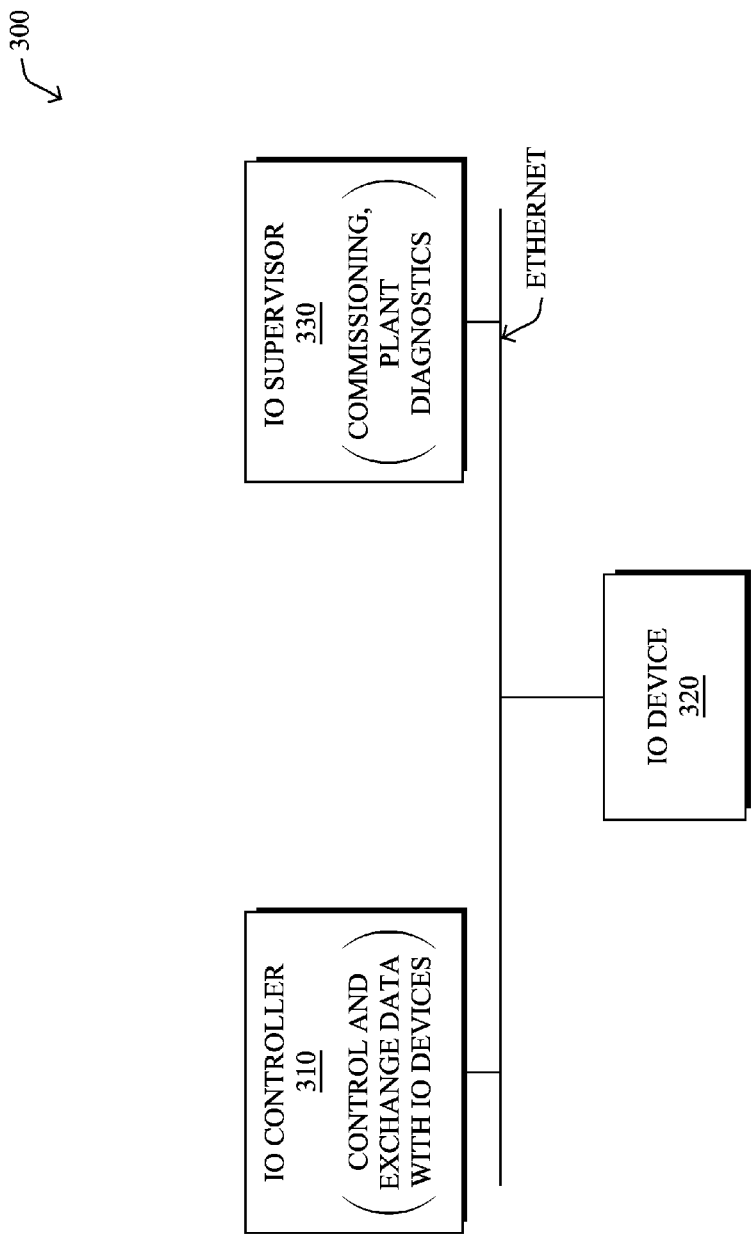

CONFIGURING FIREWALLS FOR AN INDUSTRIAL AUTOMATION NETWORK

TECHNICAL FIELD

The present disclosure relates generally to computer networks, and, more particularly, to configuring firewalls for an industrial automation network.

BACKGROUND

Many network communication protocols have been defined over the years based on particular situations, such as for large-scale networks, wireless networks, low-power and lossy networks (LLNs), and, in particular, industrial automation. For instance, an industrial automation network generally has very different characteristics than a typical internet technology network. A typical industrial network is set up and configured as previously drawn on a computer-aided design (CAD) drawing, where once the network is up and running, it generally never changes. That is, capturing a picture of the traffic at any point of the network, one would observe the same traffic pattern with very little variation day after day, year after year. In other words, in a typical industrial automation network, which is designed for communication between machines, not humans, the network structure is rigid, and the traffic pattern is predictable.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3 illustrates an example view of the communication network as an example industrial automation network;

DESCRIPTION OF EXAMPLE EMBODIMENTS

Overview

According to one or more embodiments of the disclosure, a virtual firewall is installed on a port of a device that communicates across a zone boundary within an industrial network. The virtual firewall is then configured based on operation of the industrial network, such that the port may then communicate via the firewall to a remote virtual firewall of a remote port of a remote device across the zone boundary.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication (PLC) networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
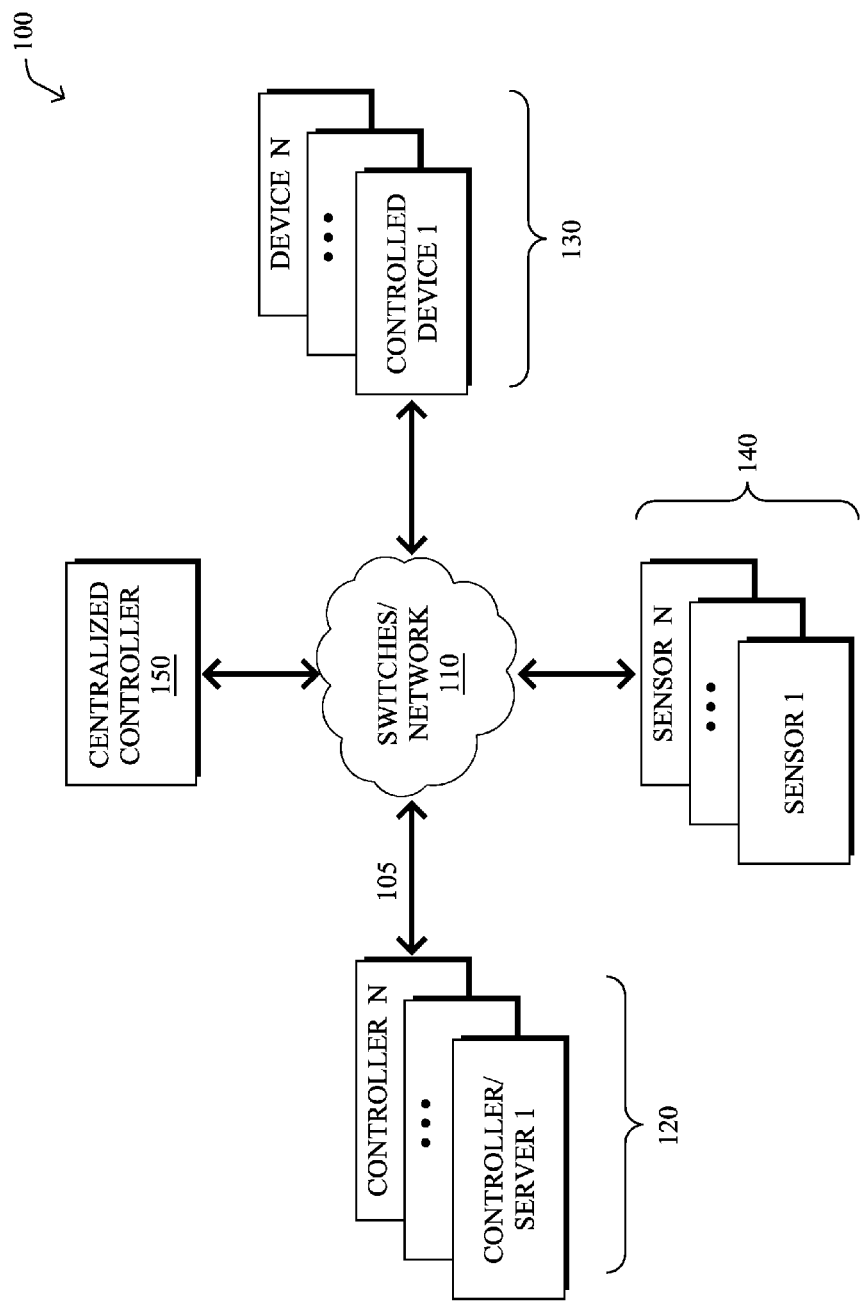
FIG. 1 illustrates an example communication network.

FIG. 1 is a schematic block diagram of a simplified example computer system 100 illustratively comprising links 105 interconnecting one or more devices through a network of routers or switches 110. For example, a set of one or more controllers (or servers) 120 may be interconnected with a set of one or more controlled devices 130 and one or more sensors 140, such as part of an industrial network. In addition, centralized controller 150 (generally, a device, herein) may be in communication with the devices of the network 100 as well.

The devices, generally, may be interconnected by various methods of communication. For instance, the links 105 may be wired links or shared media (e.g., wireless links, PLC links, etc.) where certain devices may be in communication with other devices, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, system 100 is merely an example illustration that is not meant to limit the disclosure.

Data packets (e.g., traffic and/or messages sent between the devices/nodes) may be exchanged among the nodes/devices of the computer system 100 using predefined network communication protocols such as certain known wired protocols, shared-media protocols (e.g., wireless protocols, PLC protocols, etc.), or other protocols where appropriate. In this context, a protocol consists of a set of rules defining how the nodes interact with each other.

According to various embodiments, network 100 may be, or may include, an "Internet of Things" or "IoT" network. In particular, many IoT networks are Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Industrial automation deals primarily with the automation of manufacturing, quality control and material handling processes. Industrial automation networks, in particular, are generally concerned with no-loss on-time delivery of sensed data and/or actuator instructions. As such, many protocols have been developed for the deterministic delivery of transmitted data. Industrial automation networks must also interoperate with both current and legacy systems, and must provide predictable performance and maintainability, and should provide security both from intrusions from outside the plant, and from inadvertent or unauthorized use within the plant.

Figure 2:
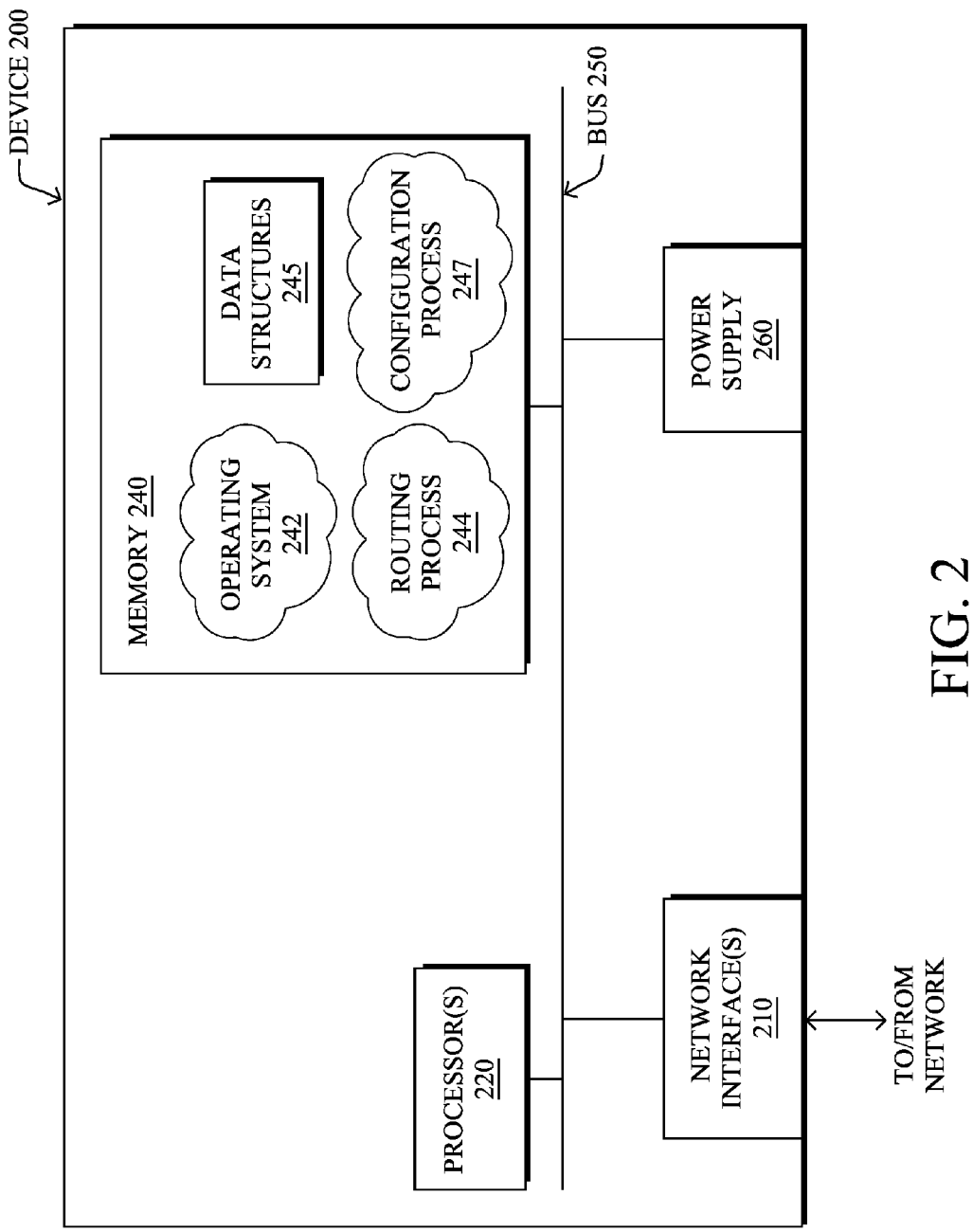
FIG. 2 illustrates an example network device/node.

FIG. 2 is a schematic block diagram of an example node/device 200 that may be used with one or more embodiments described herein, e.g., as any of the nodes/devices shown in FIG. 1 above, particularly as the centralized controller 150 as described herein. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise a routing process 244, and an illustrative configuration process 247, as described herein. Note that while routing process 244 is shown in centralized memory 240, alternative embodiments provide for the process to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 include computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. As noted above, industrial automation networks are generally deterministic networks, providing predictable performance and maintainability, and as such are generally proactively configured/routed.

As shown in FIG. 3, a typical system components of an industrial I/O (or simply "IO") system 300 (a specific implementation/component of network 100) consists of three components:
    IO Controller 310—Controls the automation task;
    IO device 320—field device monitored and controlled by IO controller (may consist of a several modules and sub-modules); and IO Supervisor 330—Software on device/PC to set parameters and diagnose individual IO devices.

In an example industrial network, an Application Relation (AR) is established between an IO Controller and an IO Device. These ARs are used to define Communication Relations (CR) with different characteristics for the transfer of parameters, cyclic exchange of data and handling of alarms. Also, each device/module within an industrial automation network has three addresses: MAC address, IP address, and device name (a logical name for the module within the total configuration). Generally, for allocation of the IP address, subnet mask, and default gateway two methods are defined: Discovery and Configuration Protocol (DCP); and Dynamic Host Configuration Protocol (DHCP).

As noted above, an industrial automation network generally has very different characteristics than a typical internet technology network, and is often set up as configured in advance, remaining unchanged thereafter. Although industrial networks have been implemented for many years, there are still inefficiencies with the design of an industrial automation network, such as the ability to derive full knowledge of the network setup, the traffic model, and operation from Control Data Configuration and Control Logic, which is the same logic that is written into Automation Controllers (e.g., programmable logic controllers (PLCs), programmable automation controllers (PACs), remote terminal units (RTUs), etc.).

Configuring Firewalls for an Industrial Automation Network

Combined with the ability of understanding network topology and individual device capability, the system herein can automate network setup and configuration, and ultimately ensure the automation process and operation being carried out safely and securely as designed.

Generally, there are two important inputs to the proposed system: Tag Configuration and Control Program Logic. "Tag Configuration" contains the input and output I/O data set of the control systems, including the tag name, tag producer (e.g., an I/O block), tag consumer(s) (e.g. a PLC), location of the device producing the tag (e.g., MAC and IP address), tag type, and tag value properties (e.g., range, data type, etc.). In most automation systems, device capability and mapping (e.g., an Electronic Data Sheet (EDS) in the Common Industrial Protocol (CIP) and EtherNet/IP ecosystem) may also be included as part of the Tag Configuration input.

As an example, a tag is industrial automation data generated or requested by a certain device, such as a temperature sensor measuring the environment (an output tag) or a cooling device requesting the temperature (an input tag). That is, an example temperature output tag may comprise a temperature sensor address, and optionally a list of who needs to access the data (e.g., the cooling device). On the other hand, a temperature input tag may comprise a cooling device address, whether the data is to be polled or pushed, at what interval, etc. Additionally, a tag can be networked (e.g., transferred on an IP network as a packet) or transmitted via a direct port connection.

"Control Program Logic", on the other hand, refers to the control programs written into industrial controllers to perform different operations. Such logic used to be programmed using a language called RLL (Relay Ladder Logic) or just LL (Ladder Logic). As microprocessors have become more powerful, notations such as sequential function charts and function block diagrams can replace ladder logic for some limited applications. Modern PLCs can now be programmed using programming language that resembles BASIC or C or other programming language with bindings appropriate for a real-time application environment. For example, IEC 61131-3:2013 specifies the syntax and semantics of a unified suite of programming languages for programmable controllers (PCs). This suite consists of two textual languages, Instruction List (IL) and Structured Text (ST), and two graphical languages, Ladder Diagram (LD) and Function Block Diagram (FBD).

As an example, access to the data (defined in the tags) can be based on control logic, such as Boolean logic, cause/effect, and so on. For instance, an input tag-based control logic may be something like "IF temp>X", where the output tag-based control logic may respond "THEN increase cooling". For the greatest efficiency, each industrial network thus needs to be specifically mapped to "connect the dots" of the particular industrial network's operation (e.g., "every ten seconds, transmit two bytes of temperature from this device to that device, and in response to temp>X, increase cooling", and so on).

Due to the complexity of the overall system, and the fact that different algorithms and rule engines needed to derive network segmentation, network traffic model, and security policy configuration, there are many aspects that are important to the proper design and implementation of an industrial automation network.

The techniques herein, in particular, allows for supporting software-defined network (SDN)-based network function virtualization (NFV) for Industrial Firewalling, such as with a centralized controller and a thin dedicated "bump in the stack" firewall on each conduit ingress/egress. As described herein, a controller may automatically set up a thin firewall at zone boundaries, based on knowledge of traffic flows including precise timings and conduit location, illustratively synchronizing the firewall to the deterministic flows. In other words, a dedicated SDN technology is defined herein that controls fine-grained firewalling functionality, which is placed on every communication medium, whether it is a keyboard input parser, a USB key, or an Ethernet port. The controller orchestrates this firewalling function as part of the overall control loops so as to allow what is expected at the time it is expected (e.g., and nothing else).

Specifically, according to one or more embodiments of the disclosure as described in detail below, a virtual firewall is installed on a port of a device that communicates across a zone boundary within an industrial network. The virtual firewall is then configured based on operation of the industrial network, such that the port may then communicate via the firewall to a remote virtual firewall of a remote port of a remote device across the zone boundary.

Illustratively, the techniques described herein may be performed by hardware, software, and/or firmware, such as in accordance with the configuration process 247, which may contain computer executable instructions executed by the processor 220 to perform functions relating to the techniques described herein, e.g., in conjunction with other suitable processes (e.g., as inputs and/or outputs to the configuration process 247, accordingly).

Figure 4A:
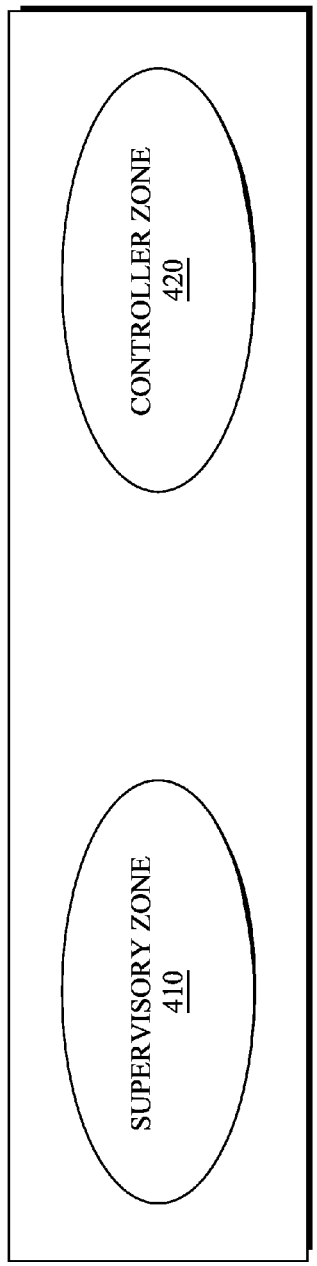
FIGS. 4A-4B illustrate examples of zones and conduits between zones, respectively.

Notably, ANSI/ISA99 defines concepts such as "zones" and "conduits" that are complex to implement with fixed firewall boxes due to their fine granularity. Generally, zones are a set of devices, and zones are connected with conduits, which can be Ethernet, USB key, keyboard, or even voice. As defined in ISA99, for instance, a security zone is a grouping of logical or physical assets that share common security requirements. A zone has a clearly defined border (either logical or physical), which is the boundary between included and excluded elements. An example of two separate zones is shown in FIG. 4A, e.g., a supervisory zone 410 and a controller zone 420.

Figure 4B:
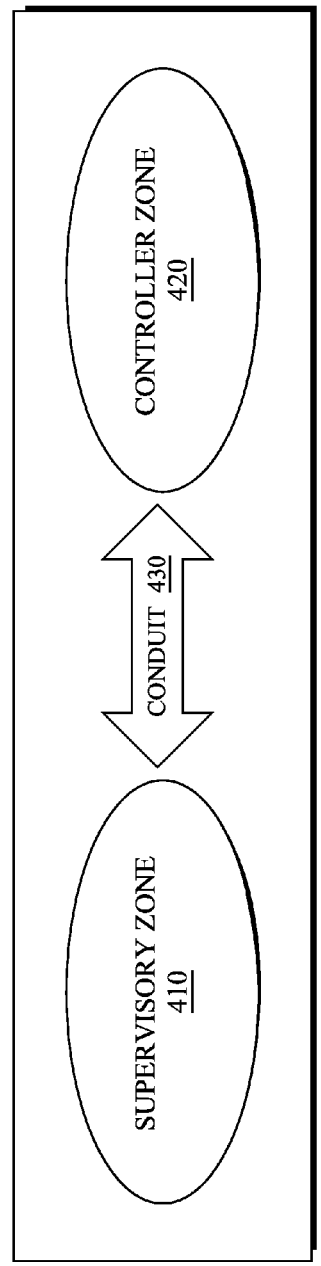

In addition, in the security model, each conduit must be specified and any other communication between zones must be blocked. A conduit is defined as the path for the flow of information between two zones. It can provide the security functions that allow different zones to communicate securely, and any transfer of electronic data between zones must have a conduit. As shown in FIG. 4B, a conduit 430 connects the two zones 410 and 420.

Notably, there can be zones within zones, and so on. The zone and conduit approach helps implement a strategy of "defense in depth", that is multiple layers of defense distributed throughout the control network. This is a strategy that has been proven in the IT community and is more advanced than can be simply achieved with firewalls and VPNs.

Generally, with the state-of-the-art products, the granularity that ISA99 requires cannot be fully achieved with large, separate firewalls. As such, the techniques herein propose a distributed/thin firewall configuration with a centralized control approach that is akin to SDN but designed to implement industrial-grade security, by enabling the zone/conduit in-depth security in an industrial/SCADA (supervisory control and data acquisition) environment.

Operationally, the techniques herein define a "filtering conduit," which is a specific form of firewall. This filtering conduit, or "virtual firewall" may generally be installed on any port, (e.g., Ethernet, USB, etc.), and may either be virtualized as a "bump in the stack" (i.e., is a software configuration at the port), or else may be installed as a physical "bump in the wire" (such as a dongle plugged into the port). That is, illustratively, every port of every device that communicates across a zone boundary within the industrial network may be configured to communicate via a respective virtual firewall.

Figure 5:
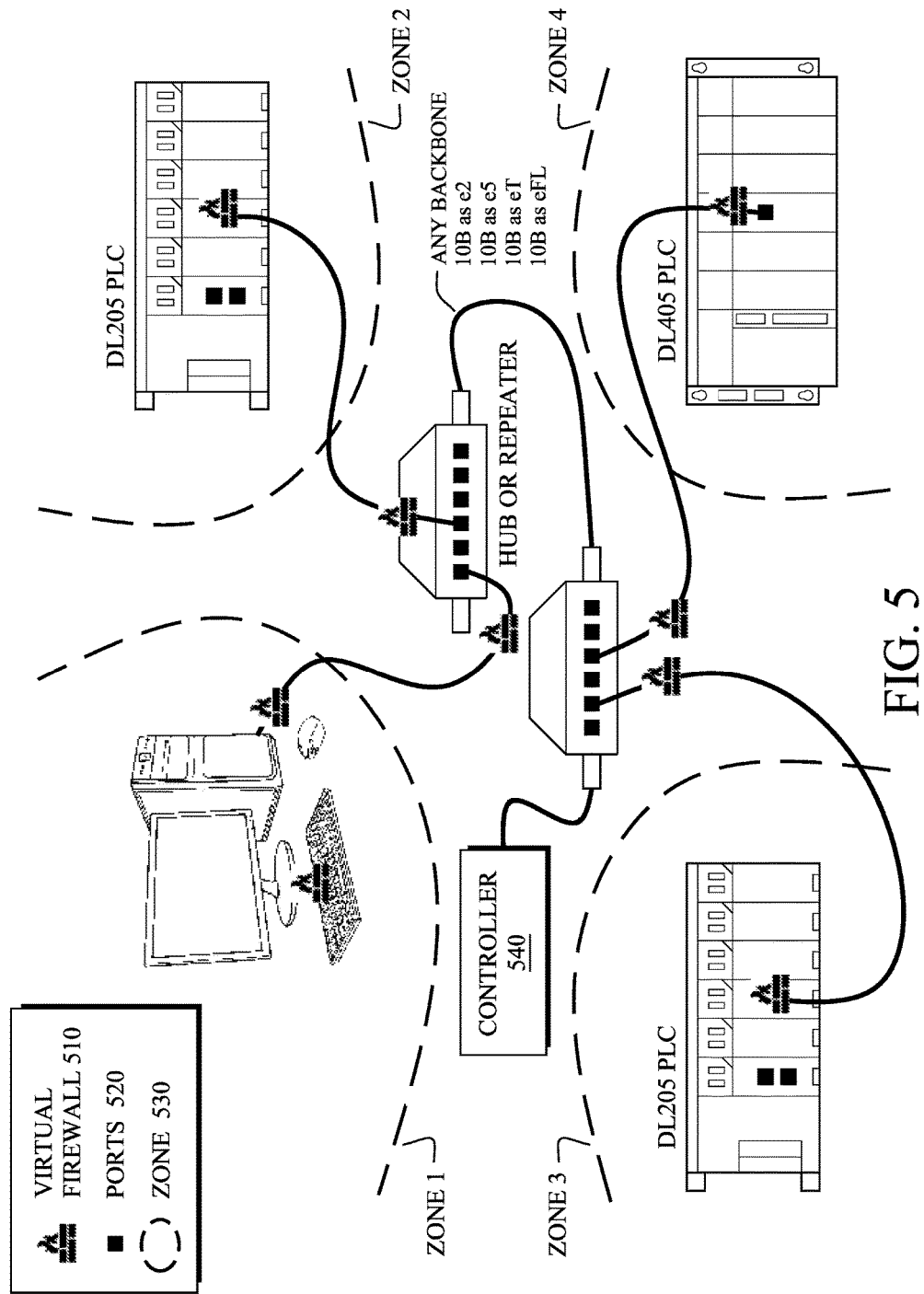
FIG. 5 illustrates an example industrial network with virtual firewalls.

FIG. 5 illustrates an example of the network 100 illustrating the placement of virtual firewalls 510 on each port 520 of each device that communicates across a zone boundary of zones 530. In general, these distributed virtual firewalls 510 (software-defined or physical dongles) may be controllable from a controller 540 (which may be internal to the industrial network, or external and protected). Notably, a single controller may be a single point of failure for security, and where such concerns exist, it may be beneficial in a scheduled architecture to form zones and zones within zones around time sources and devices dependent on a same schedule. It also makes sense to locate the controller within the controlled zones, which often means multiple controllers in different time zones. Note further that the devices and protocols shown in the industrial network of FIG. 5 are meant to be examples only (e.g., certain PLCs, certain backbone network types, and so on), and are not meant to be limiting to the scope of the disclosure herein.

The virtual firewalls 510 may be configured based on operation of the industrial network, such as synchronizing the virtual firewall with the operation/process of the industrial network, and/or relating the virtual firewall to specific industrial protocols of the industrial network in use by the port of the device (that is, specific to industrial processes, e.g., parsing industrial protocols). Also, the virtual firewalls in one embodiment may be configured/placed before any encapsulation and/or tunneling protocols (e.g., IP security (IPSec) or others), so various functionality can be performed on the traffic (e.g., deep packet inspection (DPI) and so on).

In general, an ISA99 architecture can only be fully achieved and audited if it is governed centrally and can control any possible conduit. Since placing a classical firewall on every possible port on every box is unreasonable, the techniques herein provide a small, dedicated virtual firewall function that is controlled in an SDN fashion, and is illustratively resident on every port on every device (that is, fine grained firewall functionality on a per-port basis). Note that if it is asserted that certain ports are always to be in a same zone, a firewall can be omitted (i.e., when ports of devices do not communicate across a zone boundary within the industrial network, they are allowed to communicate without a virtual firewall 510).

In one embodiment of the techniques herein, the virtual firewalls may be configured based on user intent, that is, using tags and zone architecture to automatically derive the firewall rules that are installed on the virtual firewalls at each port of each device. Because it can be determined from the architecture which port performs which piece of which standard, it is possible to automatically install rules on the virtual firewall on each port and synchronize them with the control loops or other deterministic operations.

Figure 6:
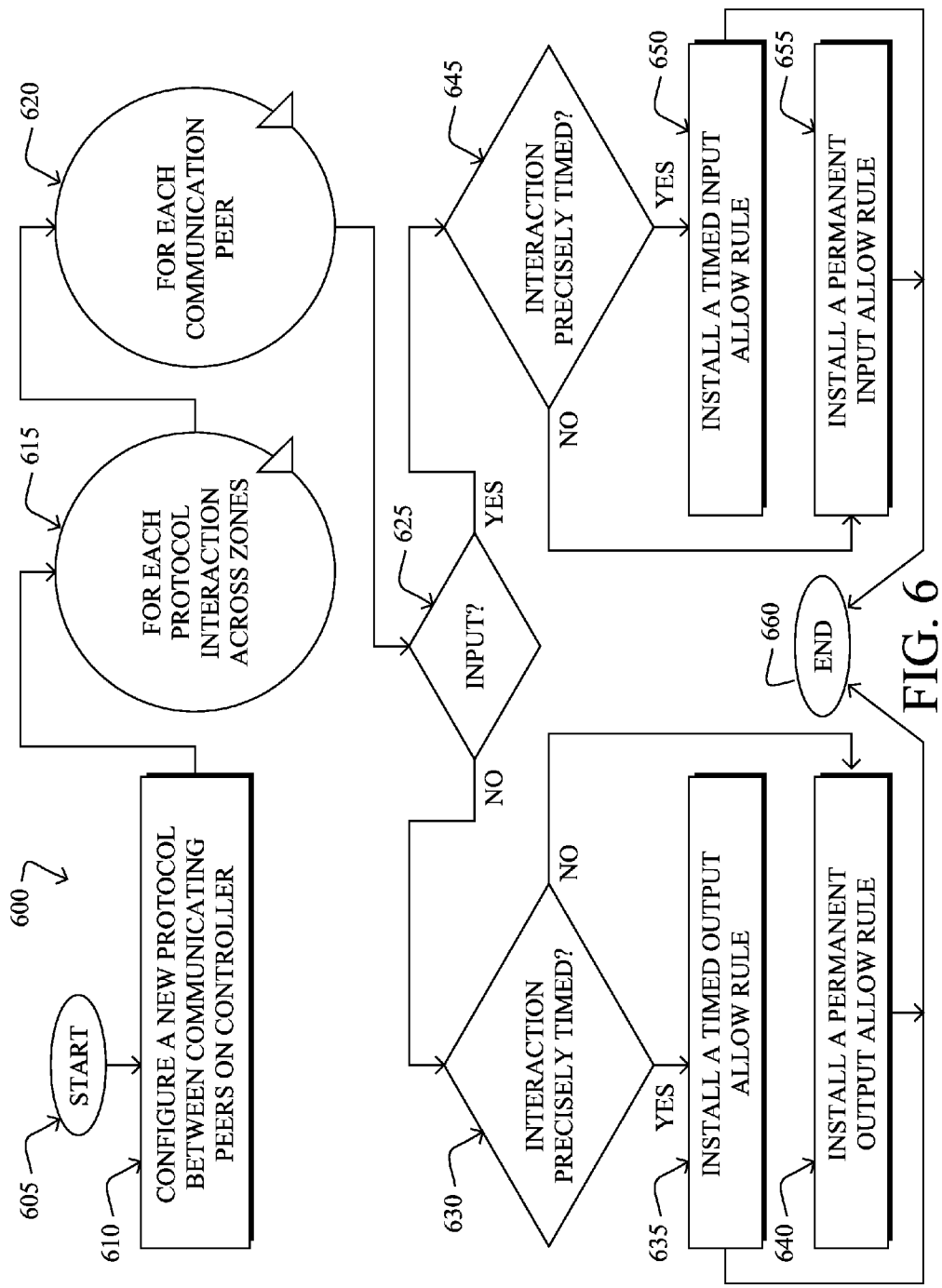
FIG. 6 illustrates an example simplified procedure for configuring firewalls for an industrial automation network.

For example, FIG. 6 illustrates an example simplified procedure for configuring firewalls for an industrial automation network in accordance with one or more embodiments described herein. The procedure 600 may start at step 605, and continues to step 610, where a new protocol is to be configured by a controller between communicating peers. Accordingly, for each protocol iteration across zones (step 615), and for each communication peer (step 620), the process determines whether the port is an input or output port in step 625. For output ports ("no"), if in step 630 the interaction on that port is precisely timed, then in step 635 a timed output "allow" rule is installed on the virtual firewall of that port. Conversely, if the interaction on that port is not precisely timed, then in step 640 a permanent output "allow" rule is installed on the virtual firewall of that port. On the other hand, for input ports ("yes" in step 625), then if in step 645 the interaction on that port is precisely timed, then in step 650 a timed input "allow" rule is installed on the virtual firewall of that port, while, if the interaction on that port is not precisely timed, then in step 655 a permanent input "allow" rule is installed on the virtual firewall of that port. The procedure 600 may then illustratively end in step 660, once each interaction for each peer is completed, and the distributed firewall system for the industrial network may thus be configured as described herein.

Figure 7:
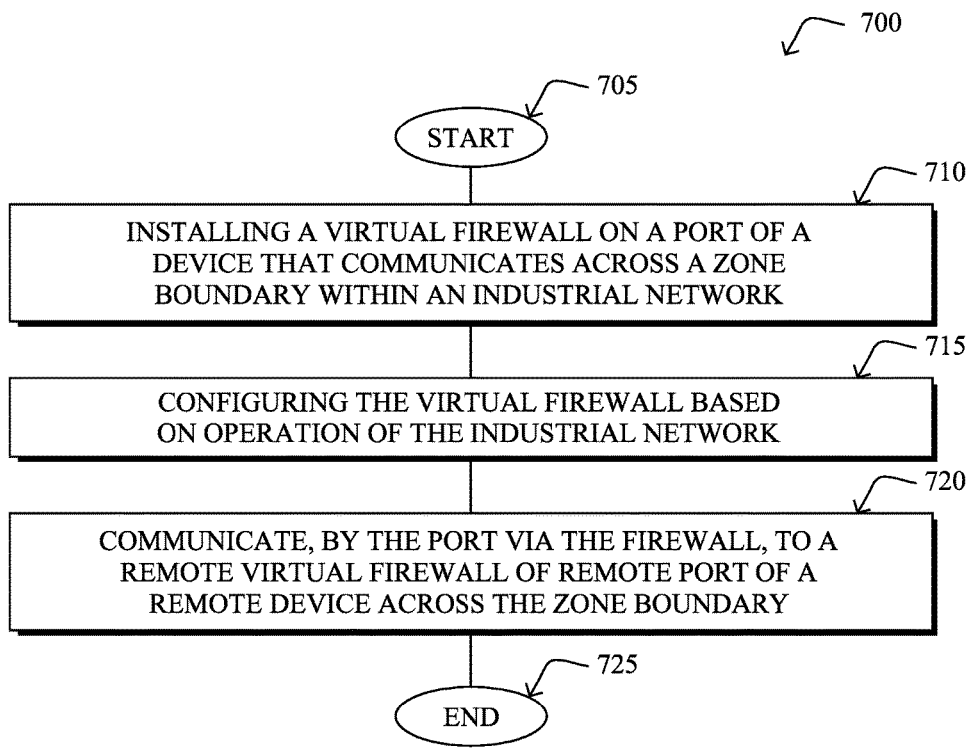
FIG. 7 illustrates another example simplified procedure for configuring firewalls for an industrial automation network.

In addition, FIG. 7 illustrates another, more general, example simplified procedure for configuring firewalls for an industrial automation network in accordance with one or more embodiments described herein. The procedure 700 may start at step 705, and continues to step 710, where, as described in greater detail above, a virtual firewall 510 may be installed on a port of a device that communicates across a zone boundary within an industrial network (e.g., as a software bump in the stack or as a hardware bump in the wire, as described above). In step 715, the virtual firewall may be configured based on operation of the industrial network (e.g., controlled from an external controller). Notably, the configuration may be based on synchronizing the virtual firewall with the operation of the industrial network, and/or relating the virtual firewall to specific industrial protocols of the industrial network in use by the port of the device, as mentioned above.

As also mentioned above, the configuring may be based on receiving tag configuration data from each device included within the industrial network, and a zone architecture associated with the industrial network, and then deriving firewall rules based on the tag configurations and zone architecture. As such, in step 715, the virtual firewall of the device may be configured based on the automatically derived firewall rules.

In step 720, the port may communicate via the firewall to a remote virtual firewall of a remote port of a remote device across the zone boundary, accordingly. Note that as mentioned herein, tunneling operations (e.g., encapsulation) may be performed at the device on an outside of the virtual firewall. The simplified procedure 700 may then end in step 725, with the firewall operating on the port, and one operating on generally every port at a zone boundary of the industrial network, as configured herein.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for configuring firewalls for an industrial automation network. In particular, the techniques provide a thin firewall that allows a centralized computation (e.g., an automated computation) and a visualization of the security enforcement, as well as the validation of the completeness of the security solution.

While there have been shown and described illustrative embodiments that provide for configuring firewalls for an industrial automation network, it is to be understood that various other adaptations and modifications may be made within the spirit and scope of the embodiments herein. For example, the embodiments have been shown and described herein with relation specifically to industrial networks. However, the embodiments in their broader sense are not as limited, and may, in fact, be used with other types of networks that may also benefit from the techniques herein, such as those with similar traffic requirements, traffic patterns, security considerations, etc. In addition, while certain protocols may have been mentioned and/or shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be is implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    installing a virtual firewall on a port of a device that communicates across a zone boundary within an industrial network;
    configuring the virtual firewall by synchronizing the virtual firewall with one or more deterministic flows in the industrial network as part of one or more control loops executing in the industrial network, and relating the virtual firewall to specific industrial protocols of the industrial network in use by the port of the device, wherein the configuring of the virtual firewall is controlled from an external controller; and
    communicating, by the port via the virtual firewall, with a remote virtual firewall of a remote port of a remote device across the zone boundary.

2. The method as in claim 1, wherein every port of every device that communicates across a respective zone boundary within the industrial network communicates via a respective virtual firewall for the respective zone boundary.

3. The method as in claim 2, wherein ports of devices that do not communicate across the respective zone boundary within the industrial network communicate without a virtual firewall.

4. The method as in claim 1, wherein the virtual firewall is a software configuration at the port of the device.

5. The method as in claim 1, wherein the virtual firewall is a dongle plugged into the port.

6. The method as in claim 1, further comprising:
    performing tunneling operations at the device on an outside of the virtual firewall.

7. The method as in claim 1, wherein configuring the virtual firewall comprises:
    receiving, at a controller, tag configuration data from each device included within the industrial network;
    receiving, at the controller, a zone architecture associated with the industrial network;
    deriving firewall rules based on the tag configurations and the zone architecture; and
    configuring the virtual firewall of the device based on the derived firewall rules.

8. An apparatus, comprising:
    one or more network interfaces to communicate within an industrial network;
    a processor coupled to the network interfaces and adapted to execute one or more processes; and
    a memory configured to store a process executable by the processor, the process when executed operable to:
        install a virtual firewall on a port of a device that communicates across a zone boundary within an industrial network;
        configure the virtual firewall by synchronizing the virtual firewall with one or more deterministic flows of the industrial network as part of one or more control loops executing in the industrial network, and relating the virtual firewall to specific industrial protocols of the industrial network in use by the port of the device, wherein the configuring of the virtual firewall is controlled from an external controller; and
        communicate, by the port via the virtual firewall, with a remote virtual firewall of a remote port of a remote device across the zone boundary.

9. The apparatus as in claim 8, wherein every port of every device that communicates across a respective zone boundary within the industrial network communicates via a respective virtual firewall for the respective zone boundary.

10. The apparatus as in claim 9, wherein ports of devices that do not communicate across the respective zone boundary within the industrial network communicate without a virtual firewall.

11. The apparatus as in claim 8, wherein the virtual firewall is a software configuration at the port of the device.

12. The apparatus as in claim 8, wherein the virtual firewall is a dongle plugged into the port.

13. The apparatus as in claim 8, wherein the process when executed is further operable to:
    perform tunneling operations at the device on an outside of the virtual firewall.

14. The apparatus as in claim 8, wherein the process when executed to configure the virtual firewall is further operable to:
    receive, as a controller, tag configuration data from each device included within the industrial network;
    receive, at the controller, a zone architecture associated with the industrial network;
    derive firewall rules based on the tag configurations and the zone architecture; and
    configure the virtual firewall of the device based on the derived firewall rules.

15. A tangible, non-transitory, computer-readable media having software encoded thereon, the software when executed by a processor operable to:
    install a virtual firewall on a port of a device that communicates across a zone boundary within an industrial network;
    configure the virtual firewall by synchronizing the virtual firewall with one or more deterministic flows of the industrial network as part of one or more control loops executing in the industrial network, and relating the virtual firewall to specific industrial protocols of the industrial network in use by the port of the device, wherein the configuring of the virtual firewall is controlled from an external controller; and
    communicate, by the port via the virtual firewall, to a remote virtual firewall of a remote port of a remote device across the zone boundary.

16. The computer-readable media as in claim 15, wherein every port of every device that communicates across a respective zone boundary within the industrial network communicates via a respective virtual firewall for the respective zone boundary.

* * * * *

UNITED STATES PATENT AND TRADEMARK OFFICE
CERTIFICATE OF CORRECTION

PATENT NO. : 10,243,926 B2
APPLICATION NO. : 15/094177
DATED : March 26, 2019
INVENTOR(S) : Pascal Thubert et al.

It is certified that error appears in the above-identified patent and that said Letters Patent is hereby corrected as shown below:

In the Specification

In Column 9, Line 52, should read:
the components and/or elements described herein can be Signed and Sealed this
Seventh Day of January, 2020

Andrei Iancu
*Director of the United States Patent and Trademark Office*